United States Patent Office 3,840,467
Patented Oct. 8, 1974

---

3,840,467
PROCESS FOR THE PRODUCTION OF MICROCAPSULES CONTAINING HYDROPHOBIC OIL DROPS
Hiroharu Matsukawa and Keiso Saeki, Fujinomiya, Japan, assignors to Fuji Photo Film Co., Ltd., Kanagawa, Japan
No Drawing. Filed Apr. 28, 1971, Ser. No. 138,366
Claims priority, application Japan, Apr. 28, 1970, 45/36,547
Int. Cl. B01j 13/02; B44d 1/44
U.S. Cl. 252—316                      10 Claims

ABSTRACT OF THE DISCLOSURE

In a process for producing oil-containing microcapsules by complex coacervation using 2 or more hydrophilic colloids having opposite electric charges, which process comprises: (1) emulsifying a water-immiscible oil in an aqueous solution of at least 1 hydrophilic colloid ionizable in water and then admixing an aqueous solution of a hydrophilic colloid having an electric charge opposite to that of the first sol, or emulsifying a water-immiscible oil in an aqueous solution of hydrophilic colloids which are ionizable in water and at least 1 of which is positively charged; (2) causing coacervation by adding water or adjusting the pH to obtain coacervates wherein a complex colloid is adhered to the individual oil droplets; (3) cooling the coacervates to cause gelation thereof; and (4) prehardening by adjusting the system to pH 9–11 in the presence of a hardening agent, the improvement which comprises adding a polyacrylic acid compound to the system before the step of prehardening, wherein said polyacrylic acid compound is a homopolymer comprising repeating units having the formula

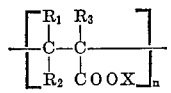

wherein $R_1$, $R_2$ and $R_3$ each represent a hydrogen atom or an alkyl group of 1–4 carbon atoms; X is a hydrogen atom, an alkali metal or an ammonium group; $n$ is an integer from 50–50,000; and said polyacrylic acid compound is present in an amount sufficient to induce complex coacervation but not coagulation. A shock-preventing agent such as sodium carboxymethyl cellulose may also be used.

BACKGROUND OF THE INVENTION

Field of the Invention

The present invention relates to a process for the production of oil-containing microcapsules.

DESCRIPTION OF THE PRIOR ART

More particularly, the present invention is concerned with the practical and useful process for the production of oil-containing microcapsules by a complex coacervation process in conditions insufficient for the coacervation, in which a polyacrylic acid compound is added to two or more kinds of hydrophilic colloids for forming the walls of microcapsules, one of said colloids being gelatin. Microcapsules having thick and less porous walls can thus be obtained.

The known process of microcapsules containing a hydrophobic oily liquid is disclosed in U.S. Pat. No. 2,800,457.

Said process of making the oil-containing microcapsules comprises the steps of (1) emulsifying a water immiscible oil in an aqueous solution of hydrophilic colloid to be ionized in water (first sol) (emulsification step), (2) admixing an aqueous solution of hydrophilic colloid to be ionized in water and having the opposite charge to the colloid of the first sol in the emulsion of (1) and adding water or adjusting the pH thereof to fix the complex colloid around each of the oil drops (coacervation step), (3) cooling the coacervates to cause gelation thereof (gelation step) and (4) adding a hardening agent and adjusting the system to pH 9~11 (hardening pretreatment).

The known process is effectively conducted in combination with two or more kinds of colloids having opposite electric charges to each other. For example, a positively charged colloidal material such as gelatin, casein, albumin or fibrinogen and a negatively charged colloidal material such as gum arabic, carboxymethylcellulose or cellulose phthalate are combined preferably in combinations with gelatin and gum arabic. The microcapsule formed by the complex coacervation process using said gelatin-gum arabic may be of any value so long as limiting the application thereof is not effected. In said complex coacervation, the microcapsule condition is based mainly on the colloid concentration, the pH, the colloid ratio and the temperature.

The maximum accumulating quantity of the coacervate is secured at the optimum pH and colloid ratio and at a certain temperature. However, said coacervation becomes more inferior upon lowering the accumulating quantity of coacervate.

With respect to the colloid concentration, the lower it is, the higher the accumulating quantity of coacervate becomes due to the variation of said coacervation condition in the sufficient direction.

On the contrary, if it is a highly concentrated colloid system, the variation of said coacervation condition to the insufficient direction leads to a lower accumulating quantity of coacervate.

In the complex coacervation of the foregoing, two kinds of colloid materials having opposite electric charges respectively, namely, a gelatin-gum arabic system tends to form a less accumulating quantity of complex coacervate and to form microcapsules having thin walls and considerably high porosity. This is due to the electrolyte strength of the negatively charged gum arabic being lower than that of the positively charged gelatin and the weak electrical mutual activities between them.

SUMMARY OF THE PRESENT INVENTION

The inventors have now found that, though a polyacrylic acid compound cannot be used as a wall-forming material together with gelatin because of its coagulation with gelatin (due to its great strength as on electrolyte), a small amount of the compound is useful as a coacervate-inducing agent for improving the above defects.

That is, oil-containing microcapsules having thick and non-porous walls can be produced by using a small amount of a polyacrylic acid compound.

The merits of the process of this invention, by which microencapsulation can be conducted will be set forth as follows:

(1) Microencapsulation can be conducted at a higher colloid concentration.

This is such a valuable point that it lowers the cost far increasing the capsule manufacturing quantity every time in a limited tank volume.

(2) A great quantity of the wall forming the membrane tends to increase the capsule quantity having a constant wall membrane thickness to a constant capsulated colloid quantity.

That is to say, the increase of the oil drops capsuled effects easily and efficiently the utilization of said colloid.

And also, even if one of low electrolyte strength, such as gum arabic is used, the additive quantity can be remarkably decreased to lower the cost.

(3) The temperature employed for the coacervation can be lowered, thus lowering the cost since less thermal energy is needed, and (4) a great quantity of the wall forming the membrane leads to a surplus capsulating process and is preferably for the production management.

Consequently, the present invention makes it possible to produce a useful microcapsule having a thick but low porous wall and to impart various characteristics to the process as mentioned above.

DETAILED DESCRIPTION OF THE INVENTION

The polyacrylic acid compound used in the present invention has the following repeating unit:

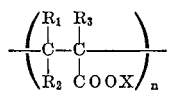

wherein $R_1$, $R_2$ and $R_3$ each represents hydrogen atom or an alkyl group of 1 to 4 carbon atoms; X represents hydrogen atom, an alkali metal or ammonium group; $n$ represents the degree of polymerization and is an integer from 50 to 5,000.

The production of the microcapsule having a thick and low-porous wall according to the present invention is successful in conducting the conventional complex coacervation process in the presence of a small quantity of polyacrylic acid compound represented by the above formula prior to the hardening pretreatment.

The practice of microcapsulation of coating oil drops in the present invention may be based on the complex coacervation caused by the dilution with water and or the adjustment of pH.

The formation of the complex coacervate based on liquid-liquid separation is easily run by operation of a separate colloid-rich phase and a colloid-poor phase, colloid from a combination of two or more kinds of hydrophilic colloid sols. Thus, at least two kinds of hydrophilic colloids having opposite electric charges to each other is essential for the complex coacervation, and at least one of the colloids is required to be gelled.

Examples of the hydrophilic colloids applicable include natural or synthetic materials, such as gelatin, agar, casein, alginate, gum arabic, carrageenan, styrene-maleic anhydride copolymer, polyethylenemaleic anhydride copolymer and the like.

As the nucleus of the individual capsules, there are, for example, naturally occurring mineral oils, animal oil and vegetable oils.

The typical examples of the mineral oils include petroleum oil and the fractions thereof, such as kerosene, gasoline, naphtha, paraffin oil and the like. Typical examples of the animal oils include fish oil, lard oil and the like. The examples of vegetable oils include peanut oil, linseed oil, soybean oil, castor oil, corn oil and the like. Further, typical examples of synthetic oils are biphenyl derivatives, phosphoric acid derivatives, naphthalene derivatives, phthalic acid derivatives, salicylic acid derivatives and the like.

The addition of an anionic, cationic or non-ionic surfactant, to emulsify the oil drops as the nucleus forming material into water may also be employed for the purpose of preventing reversion, namely formation of a water in oil type emulsion (W/O emulsion).

Thereupon, the formation of an oil in water type emulsion is obtained by emulsifying the nucleus material and oil drops in an aqueous solution of at least one or more kinds of hydrophilic colloid as a wall-forming material.

The coacervate is accumulated around the emulsified oil drop by the dilution of water and/or by pH-adjustment. Then, the coacervate accumulated on the surface of oil drop after the coacervate is cooled out of the vessel to gel said coacervate, and the pH of the system is adjusted to the alkali side after adding a hardening agent, such as formaldehyde, whereby the wall is hardened.

Thereafter, the mixture is subjected to heat treatment for the purposes of promoting the hardening of the capsule wall and increasing the heat resistance of the formed capsule.

The polyacrylic acid compound used in the present invention is effectively secured not only as the main wall-forming material but also as the coacervation-inducing agent, such that the accumulation of the complex coacervate onto the oil drop surface can be remarkably improved due to the effectual replenishment of the low electrolyte strength of a negatively charged colloid material. The increased electrical mutual activity between two or more kinds of colloid materials having opposite electric charges by adding a small amount of it thereto.

As mentioned above, when microcapsulation of the hydrophobic oil drop is carried out by using a positively charged colloid material, such as gelatin with the polyacrylic acid compound as a wall membrane-forming material instead of a negatively charged colloid material such as gum arabic, the normal microcapsules can hardly be produced since the electrolyte strength of the polyacrylic acid compound is too great to cause coagulation in the coacervation process.

Consequently, the process of the present invention is characterized by using a small amount of a polyacrylic acid compound, not as a wall-forming material, but as a coacervation inducing agent for strengthening the electrical mutual activity between two or more kinds of colloid materials having opposite electric charges.

The polyacrylic acid compound added in the present invention is preferably in the amount of 1/400 to 1/10 and especially, 1/160 to 1/30 with respect to the hydrophilic colloid (gelatin + gum arabic). If it is over 1/10, the system is easily coagulated in the coacervation process.

The complex coacervation-inducing effects of the polyacrylic acid compound on the gelatin-gum arabic system was compared, in particular with the process of capsulation by combining with water-diluting and pH adjusting thereof in the Examples of U.S. patent No. 2,800,457, and in a colloid system containing 12 parts (gelatin: 6 parts, gum arabic: 6 parts) and 210 parts of water, the complex coacervate-accumulating quantity of gelatin used being 81% at a coacervation pH of 4.5.

However, the presence of the polyacrylic acid compound according to the present invention at only quantity of 0.125 part (corresponding to 1% of colloid material) increases the complex coacervate-accumulating quantity of gelatin used to 90%.

Furthermore, the most remarkable example in the complex coacervation causing effect of the polyacrylic acid compound is secured, as in the following, by capsulating a colloid system containing 9 parts gelatin: 6 parts, gum arabic: 3 parts and reducing the gum arabic to one half, the water content being 180 parts at a coacervation pH of 4.5.

U.S. Pat. No. 2,800,457—Accumulating quantity of gelatin used 65%

This invention—Addition quantity: 0.125 part 1.4% of colloid material 80%

From the foregoing results, there is confirmed nearly similar coacervate-accumulating quantities between the process of U.S. Pat. No. 2,800,457 by conducting complex coacervation using 6 parts of gelatin and 6 parts of gum arabic as the wall membrane-forming material by the steps of, in combination, diluting with water and adjusting the pH. The process of the present invention comprises conducting complex coacervation from 6 parts of gelatin and 3 parts of gum arabic as the wall membrane-forming materials in the presence of 0.125 part of polyacrylic acid compound.

The above exhibits the merit of the effect of the polyacrylic acid compound of the present invention on the complex coacervate accumulation, thus making it possible to markedly reduce the gum arabic and to reduce largely, the cost.

As mentioned above, the addition of a minor quantity of said polyacrylic acid compound to the system consisting of two or more kinds of colloid materials having opposite electric charges brings about good results in that the quantity of the colloid material residual in the aqueous solution is reduced. On the contrary, the quantity of the colloid material used for the coacervate accumulation increases to effect production of the microcapsule having a thick and low porous wall.

The capsulating method by the period art coacervation process is defective in that the capsule, in which the plural oil drops formed are gathered, remains in hardening the wall (for example, it requires, usually, over 1 day in the presence of a hardener).

Thereupon, another prior art, U.S. Serial No. 848,411, now United States Pat. No. 3,687,865 which improved the foregoing demerits, may also be effective to secure the purpose in combination with the present invention. That is to say, the preparations of the mono-nucleus capsule consisting of a single particle and the plural nucleus capsule consisting of plural particles can be obtained by a hardening treatment in a short time, and the combination with the present invention renders the foregoing purpose successful even in the higher concentration.

As disclosed in U.S. Pat. 3,687,865 Katayama, et al., shock-preventing agents which may be used are polyelectrolytes having an anionic functional group. As examples of such polyelectrolytes may be mentioned modified cellulose, an anionic starch derivative, an anionic acid polysaccharide, a condensate of naphthalene sulfonic acid and Formalin, a hydroxyethyl cellulose derivative, a copolymer of vinylbenzene sulfonate and a copolymer of sodium acrylate.

As examples of modified cellulose, there may be mentioned polysaccharides having β-1,4-glucoside bonds of glucose and having anionic functional groups. Part or all of the hydroxyl groups of the cellulose may be etherified or esterified. Illustrative of cellulose ethers are carboxymethyl cellulose, carboxyethyl cellulose and metal salts thereof, and illustrative of cellulose esters are cellulose sulfate, cellulose phosphate and metal salts thereof.

The anionic starch derivative may be one which is composed of a linear polysaccharide amylose formed by only α-1,4 bonds of D-glucose, and a branched polysaccharide amylopectin formed by mainly α-1,4 bonds of D-glucose and partially side chain branched by α-1,6 bonds.

As examples of the above starch derivatives may be mentioned carboxymethyl starch, carboxyethyl starch, starch sulfate, starch phosphate and starch xanthate. These are obtained by etherification or esterification of corn starch, wheat starch, rice starch, potato starch, sweet potato starch or tapioca starch, which may be extracted from either the seeds or the roots of the plants in high yield.

As examples of the anionic acid polysaccharides, there may be mentioned polygalacturonic acid, which is obtained by polycondensating linearly D-galacturonic acid between α-1,4 bonds thereof. The acid polysaccharide contains pectin, pectic acid and pectinic acid. These are basic substances comprising pectin matter in a high plane and have been defined as follows:

pectinic acid—polygalacturonic acid in the colloid form containing some methyl ester groups
pectin—water soluble pectinic acid containing methyl ester groups
pectic acid—polygalacturonic acid in the colloid form containing no methyl ester groups The separation of these compounds may be conducted, in general, by extraction from acids.

The condensate or naphthalene sulfonic acid and Formalin is represented by the following formula:

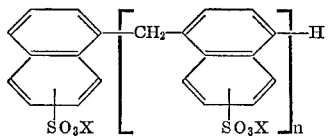

wherein X is a hydrogen atom, an alkali metal or an ammonium group, and $n$ is a positive integer.

Shock-preventing ability of the above condensate is influenced by the degree of polymerization, and it is preferable that $n$ be 5 to 9. In general, the larger the value of $n$, the more water-solubility and viscosity increases. These compounds are described in Kogyo Kagaku Zashi 66 [1], pp. 55–69 (1963).

As examples of the hydroxyethyl cellulose derivatives, there may be mentioned carboxymethyl ether of hydroxyethyl cellulose, hydroxyethyl cellulose sulfate and hydroxyethyl cellulose phosphate and the like.

As examples of the copolymers of vinylbenzene sulfonate, there may be mentioned vinylbenzene sulfonate-acryloylmorpholine copolymer, vinylbenzene sulfonate-morpholinomethylacrylamide copolymer, vinylbenzene sulfonate acrylamide copolymer, vinylbenzene sulfonate-vinylpyrrolidone copolymer, and vinylbenzene sulfonate-methoxymethylacrylamide.

These polymers contain the following group in the molecule:

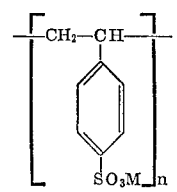

wherein M is an alkali metal and $n$ is a positive integer. The amount of vinylbenzene sulfonate in the copolymer is preferably 45–95 mol percent, more preferably 60–85 mole percent, and it is preferred, for the purpose of this invention, to use a copolymer having a molecular weight of 10,000–3,000,000, particularly 100,000–1,000,000.

As examples of copolymers of acrylic acid, there may be mentioned acrylic acid-acryloylmorpholine copolymer, acrylic acid-morpholinomethylacrylamide, acrylic acid-acrylamide copolymer, acrylic acid-vinylpyrrolidone copolymer, and acrylic acid-methoxymethylacrylamide.

These polymers contain the following group:

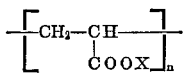

wherein X is a hydrogen atom or an alkali metal, and $n$ is a positive integer.

The amount of acrylic acid in the copolymer is preferably in 40–95 mol percent, especially 50–85 mol percent, and it is preferable, for the purposes of this invention, to use a copolymer having molecular weight of 6,000–2,000,000, especially 50,000–1,000,000.

The major reasons are based on the possibility of converting the pH to alkalinity at once, even under the coacervation condition (for example, high colloid concentration) insufficient to produce the mononucleus capsule, by adding a shock-preventing agent in the presence of a hardening agent, such as aldehydes in the pre-hardening treatment.

The term "shock" as used herein pertains to increasing the viscosity of the system suddenly at pH near to the isoelectric point of the gelatin in carrying out the pre-hardening treatment of the coacervation system containing gelatin, and the "shock-preventing agent" represents a solution preventing the shock.

The present invention, as mentioned above, is extremely valid for producing microcapsules.

The present invention will be illustrated by the following examples which are intended to be illustrative and not limitative of the present invention.

In the Examples, the evaluation of heat resistance of the capsule is carried out by the steps of applying a capsule, formed from a system dissolving crystal violet lactone in oil drops in a proportion of 2% based on the oil, to a base paper, maintaining it in a hot-air dryer, putting the capsule face and a clay paper face together and investigating the development on said clay paper face.

The clay paper is prepared by the following process.

100 parts of acid clay, treated with sulfuric acid, was dispersed into 300 parts of water containing 6 parts of 40% caustic soda, and homogenized.

After adding 40 parts of Dow Latex 636 (trade name, styrene butadiene latex produced by Dow Chemical Corp.) thereto, the resultant solution was applied to a base paper of 50 g./m.$^2$ in a proportion of 12 g./m.$^2$ based on the solid content by means of a coating rod.

In Examples, "part" represents "part by weight."

EXAMPLE 1

6 parts of acid-treated gelatin having an isoelectric point of 7.8 and 6 parts of gum arabic were dissolved in 30 parts of water at 40° C.

After adding 0.5 parts of Turkey oil as the emulsifier thereto, a 20% solution of crystal violet lactone (CVL) dissolved in 30 parts of dichlorodiphenyl was then emulsified in said colloid solution with vigorous stirring to form an O/W type emulsion.

When the oil drop size was 6–10μ, the stirring was stopped and 210 parts of warm water (45° C.) dissolved previously with 0.5 parts of "Aron" A–10H (trade name, polyacrylic acid having 25% of solid content, 0.08 of intrinsic viscosity, produced by the Toa Gosei Chemical Industry Co., Ltd.) was added thereto.

50% acetic acid was successively dropped thereto to adjust the pH to 4.5 with continuing the stirring. After maintaining the system at that temperature with stirring for 15 minutes, the vessel was cooled out of the wall to gel the colloid wall.

The stirring was continued and when the solution temperature was 15° C., 3.0 parts of a 37% formaldehyde solution was added.

On becoming 10° C., a 10% caustic soda solution was added dropwise with stirring the system overnight to adjust the pH to 10.0. The solution was then heated to 50° C. over 20 minutes to obtain a plural nucleus capsule having a particle size greater than 25 microns.

The capsulation of this Example increased about 10% of the quantity of colloid depending upon the capsule wall in comparison with the process without using the polyacrylic acid compound (U.S. Pat. No. 2,800,457) and could provide a capsule having a thick and low porosity wall.

EXAMPLE 2

The inventors have already proposed a process for producing microcapsules at high concentration using a shock-preventing agent, and the following example will serve to set forth the capsulation in combination with the shock-preventing agent and the polyacrylic acid compound of the present invention.

6 parts of acid-treated gelatin having isoelectric point of 7.94 and 6 parts of gum arabic were dissolved in 30 parts of water at 40° C.

After adding 0.5 parts of Turkey oil as the emulsifier thereto, 30 parts of dichlorodiphenyl dissolved in 2.0% CVL was emulsified in said colloidal solution with stirring to form an O/W emulsion.

When the oil drop size was 6–10μ, the stirring was stopped, and 180 parts of warm water (45° C.) dissolved previously with 0.5 part of "Aron" A–10H was added thereto. A 50% acetic acid was successively dropped thereto to adjust the pH to 4.5 with continuous stirring.

After maintaining the system at that temperature with stirring for 15 minutes, the vessel was cooled out of the wall to gel the colloid wall accumulated.

The stirring was continued and when the solution temperature was 15° C., 3.0 parts of 37% formaldehyde solution was added.

On becoming 10° C., 25 parts of a 5% aqueous carboxymethyl cellulose solution (generally, available in the sodium salt, degree of etherification: 0.75) was added thereto.

10% caustic soda solution was dropped over a period of 15 minutes to adjust the pH to 10.0.

Said solution was further heated to 50° C. with stirring for 20 minutes to obtain the capsule solution excellent in the heat resistance. Said capsule solution was confirmed to be almost all a mono-nucleus capsule consisting of one of emulsified drop from microscopic observation.

Said capsule solution was applied to a base paper and subjected to a heat resisting test for 3 hours in a dryer at 150° C.

The so obtained capsule paper was overlayed on the clay paper face and copied by means of a ball pencil to obtain a clear developing mark on the clay paper face.

The superiority in the capsulation according to the present invention to the hitherto known process was clarified as follows:

|  | This invention | Comparative Ex. |
| --- | --- | --- |
| Accumulating quantity of gelatin used, percent | 90 | 81 |
| Viscosity at 10° C., cps | 16.5 | 32.0 |
| Viscospty when dripping alkali, cps | 33.2 | 60.0 |

From the above table, by employment of the process of the present invention, it was confirmed that the accumulating quantity was increased with lowering markedly the viscosity.

In the following Examples, the effects of the polyacrylic acid compound according to the present invention on the accumulating quantity and the viscosity are set forth in the table as compared with the process employed without using said polyacrylic acid compound.

EXAMPLE 3

To 6 parts of acid-treated gelatin having an isoelectric point of 8.1 and 3 parts of gum arabic was added 0.6 parts of "Aron" A–20LL (Trade name, sodium polyacrylate, 20% solid content, 0.05 of intrinsic viscosity, produced by the Toa Gosei Chemical Industry Co., Ltd.). The mixture was dissolved in 30 parts of water at 40° C.

After adding 0.5 parts of Turkey oil as the emulsifier thereto, 30 parts of dichlorodiphenyl dissolved in 2.0% CVL was emulsified in the colloidal solution with stirring vigorously to form an O/W emulsion. When the oil drop size became 8–10μ, the stirring was stopped.

After adding further, 140 parts of warm water (45° C.) thereto, 30 parts of dichlorodiphenyl dissolved 2.0% pH to 4.5 with continuous stirring. The vessel was cooled to 8° C. out of the wall, and after 3.0 parts of 37% formaldehyde was added, 30 parts of a 20% aqueous solution of cellulose sulfate (degree of esterification: 0.83) was added thereto.

Then a 20% aqueous caustic soda solution was added dropwise over a period of 15 minutes to adjust the pH to 10.0.

The solution was heated to 50° C. to increase the heat-resistance of said capsule. The so obtained capsule was a mono-nucleus capsule and was heat resistant.

|  | This invention | Comparative Ex. |
| --- | --- | --- |
| Accumulating quantity of gelatin used, percent | 80 | 65 |
| Viscosity at 10° C., cps | 13.1 | 21.7 |
| Viscosity when adding alkali, cps | 49.1 | 230.0 |

EXAMPLE 4

6 parts of acid-treated gelatin having an isoelectric point of 7.98 and 6 parts of gum arabic were dissolved in 30 parts of water at 40° C.

After adding 0.5 parts of Turkey oil as the emulsifier thereto, 30 parts of dichlorophenyl dissolved 2.0% CVL was emulsified in the colloidal solution with stirring vigorously to form an O/W emulsion. When the oil drop size became 6–10μ, the stirring was stopped. After adding 180 parts of warm water (45° C.), a 10% aqueous sulfuric acid solution was added dropped with continuous stirring to adjust the pH to 4.3.

The resultant solution was maintained at that time with stirring for 15 minutes, and the vessel was cooled out of the wall.

The stirring was continued, and when the solution temperature was 17° C., 10 parts of a 5% aqueous solution of "Aron" A–10H was added. On becoming 15° C., 3.0 parts of a 37% formaldehyde solution was added and further on becoming 10° C., 35 parts of a 5% aqueous solution of pectinic acid was added theerto.

A 10% caustic soda solution was added dropwise over a period of 15 minutes to adjust the pH to 10.0. The resulting solution was heated to 50° C. with stirring for an additional 20 minutes to obtain a mono-nucleus capsule excellent in heat resistance.

EXAMPLE 5

30 parts of mixture of chlorinated paraffin Toyaparax A–40 (Trade name, Chlorine content: 40%, produced by the Toyo Soda Manufacturing Co., Ltd.) Kerosene=4:1 dissolved in 2% CVL was emulsified in a colloid sol consisting of 4 parts of gum arabic, 0.5 part of "Aron" A–10H and 25 parts of warm water to make an O/W emulsion. When the oil drop became a max. 10μ, the stirring was stopped.

Said resultant emulsion was added to an aqueous gelatin solution consisting of 6 parts of acid-treated gelatin having an isoelectric point of 7.9 and 165 parts of warm water (45° C.). A 50% aqueous succinic acid solution was added with stirring to adjust the pH to 4.2.

The vessel was gradually cooled with continuous stirring to gel the coacervate wall membrane.

When the system was 10° C., 30 parts of a 30% glutaraldehyde and successively 30 parts of a 5% aqueous solution of carboxyethyl cellulose (degree of etherification: 0.8) were added.

A 20% aqueous caustic soda solution was added thereto over 10 minutes to adjust the pH of the system to 10.0.

The so obtained capsule solution was heated to 50° C. to obtain a hardened capsule.

| | This invention | Comparative Ex. |
|---|---|---|
| Accumulating quantity of gelatin used, percent | 84 | 72 |
| Viscosity at 10° C., cps | 15.1 | 28.4 |
| Viscosity when adding alkali, cps | 43.0 | 155.0 |

EXAMPLE 6

Example 3 was repeated except that 0.6 parts of "Aron" A–20LL was replaced with 0.4 part of "Aron" A–30 (Trade name ammonium polyacrylate, 30% solid content, 0.1 of intrinsic viscosity, produced by the Toa Gosei Chemical Industry Co., Ltd.) and 30 parts of a 5% aqueous solution of cellulose phosphate (degree of esterification: 0.85) was used as the shock-preventing agent.

The so obtained product was a mono-capsule.

EXAMPLE 7

In Example 5, the chlorinated paraffin was replaced with dioctyl phthalate, 165 parts of a gelatin solution with 175 parts, and 50% aqueous solution of succinic acid with 10% aqueous solution of hydrochloric acid respectively.

The vessel was cooled to coagulate the dioctyl phthalate-coating coacervate wall consisting of these systems.

When it was 15° C., 2.5 parts of a 30% glyoxal was poured and successively, on being 10° C., 30 parts of a 5% aqueous solution of carboxymethyl starch (derived from corn, degree of etherification: 0.75) was added.

A 20% aqueous solution of caustic soda was dropped thereto over 15 minutes to adjust the pH of said system to 10.0.

Said solution was heated to 50° C. to increase the heat resistance of the capsule.

EXAMPLE 8

Example 3 was repeated except that 135 parts of water and 40 parts of a 5% aqueous solution of sodium nucleate were used under a pH of 4.2. The so obtained product was a mono-capsule having a high heat resistance.

Although the present invention is adequately described in the foregoing specification and examples included therein, it is readily apparent that various changes and modifications may be made without departing from the scope and spirit of the same.

What is claimed is:

1. In a process for producing oil-containing microcapsules by complex coacervation using two or more hydrophilic colloids having opposite electric charges to each other, which process comprises:

(1) emulsifying a water-immiscible oil in an aqueous solution of at least one hydrophilic colloid ionizable in water (first sol) and then admixing an aqueous solution of a hydrophilic colloid having an electric charge opposite to that of the first sol, or emulsifying a water-immiscible oil in an aqueous solution of hydrophilic colloids which are ionizable in water and at least one of which is positively charged;

(2) either adding water thereto or adjusting the pH thereof to cause coacervation, thus obtaining coacervates wherein a complex colloid is adhered to the individual oil droplets;

(3) cooling the coacervates to cause gelation thereof; and (4) prehardening by adjusting the system to pH 9–11 in the presence of a hardening agent;

the improvement which comprises adding a polyacrylic acid compound to the system before the step of pre-hardening, wherein said polyacrylic acid compound is a homopolymer comprising repeating units represented by the following formula:

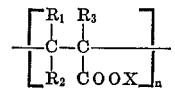

wherein $R_1$, $R_2$ and $R_3$ each represent a member selected from the group consisting of a hydrogen atom and an alkyl group of from 1 to 4 carbon atoms; X is a member selected from the group consisting of a hydrogen atom, an alkali metal, and an ammonium group; and $n$ represents an integer of from 50 to 50,000, said polyacrylic acid compound being present in an amount sufficient to induce complex coacervation but not coagulation.

2. The process of claim 1, wherein one of said colloids is gelatin and the other of said colloids is gum arabic.

3. The process of claim 1, wherein the amount of said polyacrylic acid compound present is 1/400 to 1/10 by weight based on the total weight of hydrophilic colloids present.

4. The process of claim 2, wherein said system further contains a shock-preventing agent, said shock-preventing agent being present in an amount sufficient to prevent increase in the viscosity of said coacervation system suddenly at a pH near the iso-electric point of gelatin, said shock-preventing agent being added during said pre-hardening, said shock-preventing agent being selected from the group consisting of:
- a modified cellulose comprising polysaccharides having beta-1,4-glucoside bonds of glucoses and having anionic functional groups,
- an anionic starch derivative composed of a linear polysaccharide amylose formed by only alpha-1,4 bonds of D-glucose, and a branched polysaccharide amylopectin formed by mainly alpha-1,4 bonds of D-glucose and a partially side chain branched by alpha-1,6 bonds,
- an anionic acid polysaccharide, obtained by polycondensating linearly D-galacturonic acid between the alpha-1,4 bonds thereof, said acid polysaccharide containing pectin, pectic acid, and pectinic acid,
- a condensate of naphthalene sulfonic acid and Formalin, which condensate is represented by the formula:

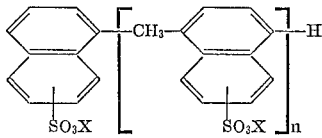

wherein X is a hydrogen atom, an alkali metal, or an ammonium group, and $n$ is a positive integer,
- a hydroxyethyl cellulose derivative selected from the group consisting of the carboxymethyl ether of hydroxyethyl cellulose, hydroxyethyl cellulose, sulfate, and hydroxyethyl cellulose phosphate,
- a vinyl-benzene sulfonate copolymer selected from the group consisting of a vinylbenzene sulfonate-acryloylmorpholine copolymer, a vinylbenezne sulfonate-morpholinomethylacrylamide copolymer, a vinylbenzene sulfonate acrylamide copolymer, a vinylbenzene sulfonate-vinylpyrrolidone copolymer, and a vinylbenzene sulfonate-methyloxy-methylacrylamide, said copolymer having the following group within its molecular structure:

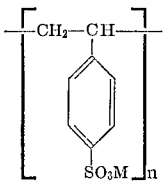

wherein M is an alkali metal and $n$ is a positive integer, and
- an crylic acid copolymer selected from the group consisting of an acrylic acid-acryloylmorpholine copolymer, an acrylic acid-morpholinomethylacrylamide copolymer, an acrylic acid-acrylamide copolymer, an acrylic acid-vinylpyrrolidone copolymer, and an acrylic acid-methoxymethylacrylamide copolymer, said copolymer having the following group within its molecular structure:

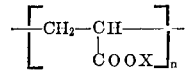

wherein X is a hydrogen atom or an alkali metal, and $n$ is a positive integer.

5. The process of claim 1, wherein said hydrophilic colloid is a member selected from the group consisting of gelatin, agar, casein, alginate, gum arabic, carrageenan, styrene-maleic anhydride copolymers, and polyethylene-maleic anhydride copolymers.

6. The process of claim 1, wherein said polyacrylic acid compound is present in an amount of from 1/60 to 1/30 by weight based on the total weight of said hydrophilic colloids present.

7. The process of claim 1, wherein said coacervation takes place at a pH of 4.2.

8. The process of claim 1, wherein said coacervation takes place at a pH of 4.3.

9. The process of claim 1, wherein said coacervation takes place at a pH of 4.5.

10. The process of claim 2, wherein said gelatin is present in an amount of 6 parts and said gum arabic is present in an amount of 3 parts, the polyacrylic acid compound being present in an amount of 0.125 parts.

References Cited

UNITED STATES PATENTS

| | | | |
|---|---|---|---|
| 3,687,865 | 8/1972 | Katayama et al. | 252—316 |
| 2,651,883 | 9/1953 | Hedrick et al. | 117—100 AUX |
| 2,969,331 | 1/1961 | Brynko et al. | 252—316 |
| 3,265,629 | 8/1966 | Jensen | 252—316 |
| 3,016,308 | 1/1962 | Macaulay | 252—316 X |

FOREIGN PATENTS

| | | | |
|---|---|---|---|
| 2,027,819 | 12/1970 | Germany | 252—316 |

RICHARD D. LOVERING, Primary Examiner

U.S. Cl. X.R.

117—36.2, 62.2, 100 A; 264—4